United States Patent [19]

McGeehan et al.

[11] Patent Number: 4,947,453

[45] Date of Patent: Aug. 7, 1990

[54] TRANSPARENT TONE-IN BAND TRANSMITTERS, RECEIVERS AND SYSTEMS

[75] Inventors: Joseph P. McGeehan, Corsham; Andrew Bateman, Bath, both of England

[73] Assignee: National Research Development Corporation, London, United Kingdom

[21] Appl. No.: 240,452

[22] Filed: Sep. 2, 1988

Related U.S. Application Data

[63] Continuation of Ser. No. 890,335, Jul. 29, 1986, abandoned, which is a continuation-in-part of Ser. No. 617,733, Jun. 6, 1984, Pat. No. 4,691,375.

[30] Foreign Application Priority Data

Aug. 2, 1985 [GB] United Kingdom ................ 8519545

[51] Int. Cl.$^5$ ............................................ H04B 1/76
[52] U.S. Cl. ...................................... 455/47; 455/71; 455/103; 455/202
[58] Field of Search ............... 455/46, 47, 68, 70, 455/71, 103, 104, 105, 118, 201, 202, 257, 258, 265, 59; 375/37, 47, 71, 97, 38; 380/33, 34, 38, 39, 40; 370/110.1, 110.4, 111

[56] References Cited

U.S. PATENT DOCUMENTS

| 2,026,613 | 1/1936 | Chireix et al. | 380/39 |
| 2,389,356 | 11/1945 | Goldstein | 380/39 |
| 2,778,877 | 1/1957 | Caruthers | 370/74 |
| 3,201,691 | 8/1965 | Lyon | 455/71 |
| 3,271,681 | 9/1966 | McNair | 455/47 |
| 3,586,781 | 6/1971 | Jones | 370/111 |
| 4,675,880 | 6/1987 | Davarian | 375/102 |

FOREIGN PATENT DOCUMENTS 981791 1/1962 United Kingdom .
2161661 5/1985 United Kingdom .
2163326 8/1985 United Kingdom .
2168223 11/1985 United Kingdom .

OTHER PUBLICATIONS

"Single Sideband Principles and Circuits"; Pappenfus, Bruene and Schoenike, McGraw-Hill Book Co., N.Y., N.Y., 1964, pp. 31–41.
Ericcson Review, vol. 44, No. 1, 1967, pp. 34–52, N. Tangen et al., "Centralized Fundamental and Pilot Frequency Generating Equipment".
IEEE Conference on Communications, Boston; Jun. 19–22, 1983, vol. 1, pp. 245–249, A. J. Bateman et al.
IEE Conferences on Communications Equipment Systems, pp. 121–126, 1982.
A Filter Family Designed for Use in Quadrature Mirror Filter Banks, Johnson, 1980.

Primary Examiner—Benedict V. Safourek
Attorney, Agent, or Firm—Cushman, Darby & Cushman

[57] ABSTRACT

In transparent tone-in-band communication systems a notch in the frequency band is usually formed and then the resulting spectrum is translated in frequency to an intermediate frequency range as part of the transmission process. In a transmitter of the present invention a more simple arrangement is used in which the notch is formed directly in an intermediate frequency range by using mirror filters to divide an input signal into two portions and supply respective mixers, each having one output sideband in the intermediate frequency range. The mixers receive different reference frequencies and the mixer outputs are supplied to a summing circuit whose output is passed to a band pass filter to remove the unwanted sidebands. The original frequency spectrum is restored at the receiver by mixer processes of shifting the two selected sidebands similar to, but the inverse of, those used in the transmitter.

18 Claims, 4 Drawing Sheets

TRANSPARENT TONE-IN BAND TRANSMITTERS, RECEIVERS AND SYSTEMS

This is a continuation of application Ser. No. 06/890,335, filed Jul. 29, 1986, which was abandoned upon the filing hereof and which is a continuation-in-part of application Ser. No. 06/617,733, filed 6/6/84, now U.S. Pat. No. 4,691,375.

The present invention relates to transmitters, receivers and systems for transparent tone-in-band operation, particularly for use where transmitter and receiver employ an intermediate frequency.

TTIB systems are described by J. P. McGeehan, A. J. Bateman and D. F. Burrows in "The Use of 'Transparent' Tone-In-Band (TTIB) and Feedforward Signal Regeneration (FFSR) In Single Sideband Mobile Communication Systems", IEE Conference on Communications Equipment and Systems 82, pages 121 to 126, 1982. In an example of a known TTIB system the spectrum of a baseband signal, for example from 300 Hz to 3 kHz, is split into two approximately equal segments, for instance from 300 Hz to 1.7 kHz and 1.7 kHz to 3 kHz. The upper frequency band is translated upward in frequency by an amount equal to the width of an intervening "notch" and added to the lower frequency band. If for example the required "notch" width or band separation is 1.2 kHz the circuit output will comprise a signal extending from 300 kHz to 1.7 kHz and from 2.9 to 4.2 kHz. A low level reference tone may then be added at the center of the resulting notch which in this example would be 2.3 kHz and the composite signal is then transmitted using conventional techiques, such as single sideband (SSB), with the pilot tone in the notch acting as the reference for subsequent pilot-based processing. In the receiver, the final stages of audio processing remove the pilot in the usual way (for use in, for example, automatic gain control and automatic frequency control purposes) and perform a complementary downwards frequency translation of the upper half of the spectrum thereby regenerating the original 300 Hz to 3 kHz baseband signal. Thus TTIB gives a complete transparent channel from the baseband input of the transmitter to the baseband receiver output avoiding the disadvantage of removing a section of the band in order to insert the pilot tone but obtaining the advantages of high degree of adjacent channel protection, good correlation between fades on the pilot tone and fades on the audio signal, and a large symmetrical pull-in range for the frequency control to operate.

Other examples of TTIB systems are given in U.S. Pat. application Ser. No. 06/617,733 now U.S. Pat. No. 4,691,375 and published U.K. Patent Application No. 8513649, corresponding thereto, as well as in published U.K. Patent Application No. 8421025, corresponding to U.S. patent application Ser. No. 06/764,984 now U.S. Pat. No. 4,679,243, and published U.K. Application 8430319 corresponding to U.S. application Ser. No. 06/798,801, filed Nov. 15, 1985, all having the same inventors as the present application. These applications and the above mentioned paper are hereby incorporated into this specification by reference.

According to a first aspect of the present invention there is provided a communication system for TTIB operation comprising a transmitter comprising means for dividing a band of interest in the frequency spectrum into upper and lower portions, and for translating the upper and lower portions in frequency by differing amounts to provide a notch between the translated upper and lower portions, and means for transmitting the translated portions, and a receiver comprising means for receiving the transmitted portions, and means for dividing the received frequency band into two portions at the notch, and for translating the two portions in frequency by different amounts to provide a continuous output spectrum.

According to a second aspect of the invention there is provided a method of transmission and reception for TTIB operation comprising dividing a band of interest in the frequency spectrum into upper and lower portions, translating the upper and lower portions in frequency by differing amounts to provide a notch between the translated upper and lower portions, transmitting the translated portions, receiving the transmitted portions, dividing the received frequency band into two portions at the notch, and translating the two portions in frequency by different amounts to provide a continuous output spectrum.

The main advantage of the present invention is that the translated upper and lower portions may be in a low intermediate frequency band used by the transmitter and receiver so relaxing the specification of subsequent stages of frequency translation and filtering used in transmitters and receivers at higher intermediate frequency bands.

In the communication system according to the first aspect of the invention the means for dividing the band and frequency translation may comprise first and second filters preferably formed by mirror filter means as hereinafter defined and first and second mixers connected at the outputs of the first and second filters and receiving different reference signals, the outputs of the mixers being connected to a summing circuit.

According to a third aspect of the invention there is provided a communication system for TTIB comprising a transmitter including mirror filter means as hereinafter defined for dividing a band of interest in the frequency spectrum into upper and lower portions, means for frequency translating at least one said portion to derive a frequency spectrum with a frequency notch between the said portions, and means for transmitting the said spectrum, and a receiver including means for receiving the said spectrum, mirror filter means as hereinafter defined for dividing the received spectrum into two portions at the notch, and means for translating at least one said portion in frequency to provide a continuous output spectrum.

Mirror filter may include a pair of quadrature mirror filters (see below) or in this specification means a pair of complementary filters having a predetermined fixed or variable frequency versus attenuation characteristic between input terminals and output terminals, wherein the characteristic of one filter output is the complement of that of the other filter output.

The means for frequency translation may be as mentioned in the first aspect of the invention or may be a single or double oscillator arrangement as described in the above mentioned paper or any of the above mentioned patent applications.

The present invention also includes a TTIB system using the transmitter and/or the receiver of the first or third aspects of the invention; and further the invention includes methods corresponding to the transmitter and- /or receiver of the first and second aspects of the invention.

Further aspects of the invention include TTIB communication systems in which mirror filter means are used and/or in which the notch is derived by translating the input spectrum in frequency wherein one portion is translated by more than another portion so providing the notch. The invention also includes transmitters, receivers for such TTIB systems and methods corresponding to such systems, transmitters or receivers.

Certain embodiments of the invention will now be described by way of example with reference to the accompanying drawings, in which.

Figure 1:
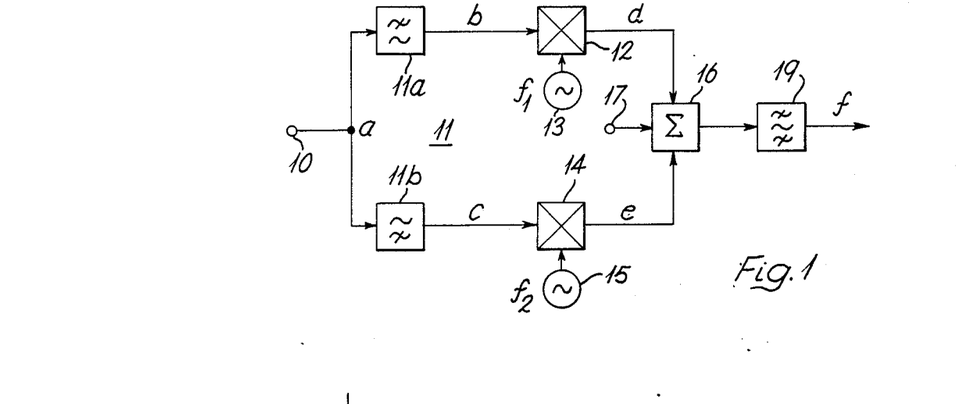
FIG. 1 is a block diagram of a transmitter for a TTIB system according to the first aspect of the invention.
Figure 2:
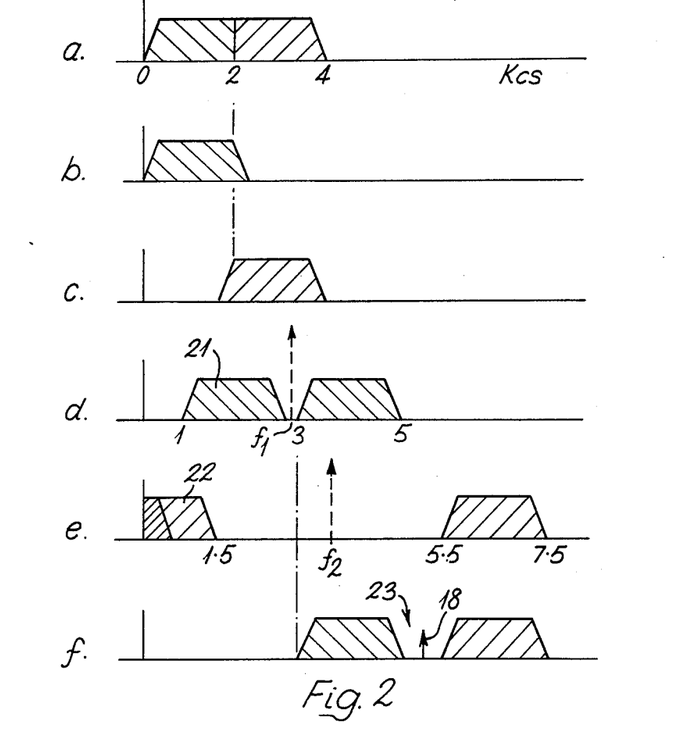
FIG. 2 shows frequency spectra which appear in the circuit of FIG. 1.
Figure 3:
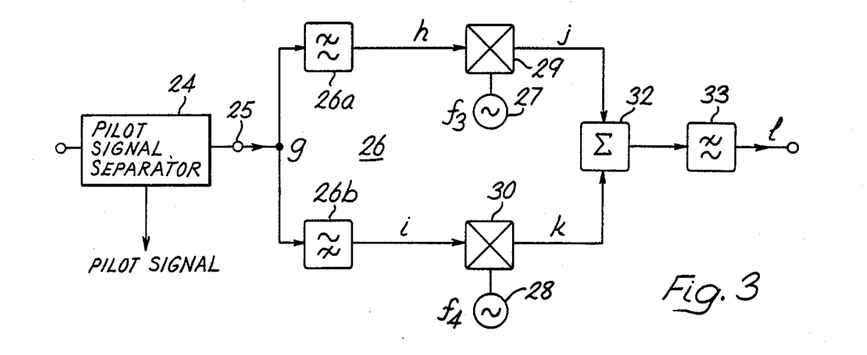
FIG. 3 is a block diagram of a receiver for a TTIB system according to the first aspect of the invention.
Figure 4:
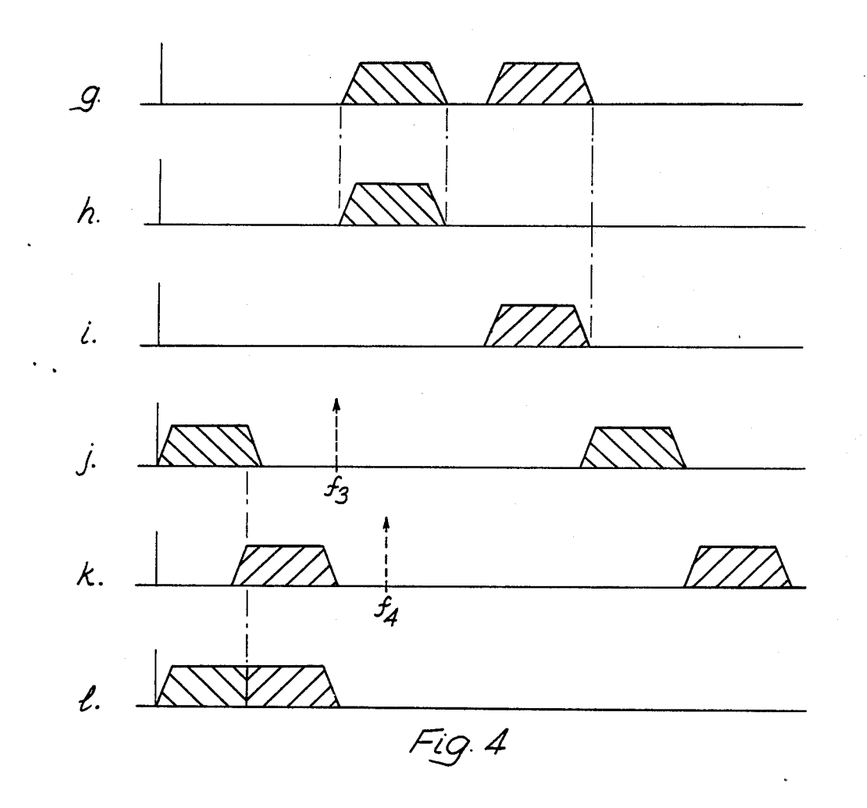
FIG. 4 shows frequency spectra which appear in the circuit of FIG. 3, and FIG. 5 and 6 are block diagrams of TTIB systems according to the second aspect of the invention.

The letters "a" to "1" denote the frequency spectra shown in FIGS. 2 and 4 and the positions at which these spectra occur in the circuits of FIGS. 1 and 3 are indicated by the letters. The spectrum 'a' of FIG. 2 is divided into two halves which are shaded in different directions and this shading indicates through-out FIGS. 2 and 4 how signals from the original spectrum are translated in frequency.

In FIG. 1 the baseband input spectrum 'a' is applied to an input terminal 10 where it is divided into lower and upper spectra 'b' and 'c' respectively by a mirror filter 11 shown for convenience in two portions 11a and 11b. The mirror filter may be a digital filter comprising a shift register having a number of stages each connected by way of a respective multiplier to summing means. The output of the summing means provides the spectrum 'b' or 'c' and the summing means is connected to a subtraction circuit which substracts the input signal at terminal 10 from the output of the summing means to provide the spectrum 'c' or 'b', respectively. As is mentioned above for complementary mirror filters, the characteristic of one filter of a pair is the complement of the characteristic of the other filter of the pair. Another type of mirror filter, known as a Quadrature Mirror Filter, is described in Johnston J. D. "A Filter Family Designed for Use in Quadrature Mirror Filter Banks" IEEE Conference on Acoustic Systems and Signal Processing, Denver 1980 pages 291–294.

The output of the filter portion 11a is supplied to a balanced mixer circuit 12 which also receives a signal at a frequency $f_1$ from an oscillator 13. The resulting spectrum is shown at 'd'. Similarly the output from the filter portion 11b passes to a balanced mixer circuit 14 which receives a signal at a frequency $f_2$ from an oscillator 15 and generates the spectrum 'e'. Since balanced mixers are used the spectra 'd' and 'e' do not contain signals at frequencies $f_1$ and $f_2$, and hence these signals are shown by dashed lines. Filters 12 and 14 are connected to a summing circuit 16 which has an input terminal 17 for injecting a pilot signal shown at 18 in 'f'. A bandpass filter 19 removes the lower side bands 21 and 22 from the spectra 'd' and 'e' to provide the transmitter output spectrum 'f'.

All the information present in the spectrum 'a' is present in the spectrum 'f' but a frequency notch 23 is provided which allows signals, such as control signals, for example the pilot signal 18, to be included in the transmitted signal with the advantages described in the above mentioned paper and patent applications.

The frequencies $f_1$ and $f_2$ are chosen to give the required notch width and to position the spectrum 'f' in the frequency band at a desired position, for example an intermediate frequency of the transmitter.

The output from FIG. 1 is after transmission by means of an SSB transmitter and receiver for example received at a terminal 25 of the receiver shown in FIG. 3. The pilot tone and any other contents of the notch are removed in a circuit 24 and used, typically in the SSB receiver, before the incoming signal is passed to the terminal 25. The spectrum 'g' is equivalent to the spectrum 'f' except that in general it will be attenuated and distorted. A mirror filter 26 having two portions 26a and 26b is used to separate the lower and upper portions of the received signal and gives spectra 'h' and 'i' of FIG. 4. These spectra are mixed with frequencies $f_3$ and $f_4$ from oscillators 27 and 28 in balanced mixers 29 and 30 to give spectra 'j' and 'k'. The frequencies $f_3$ and $f_4$ are so chosen that the lower side bands of the outputs of the mixers 29 and 30 when combined in a summing circuit 32 and then filtered in a low pass filter 33 give the original spectrum 'a' shown as 'l' in FIG. 4. Usually $f_1$ equals $f_3$, and $f_2$ equals $f_4$.

Typical values for the frequencies $f_1$ to $f_4$ are $f_1=f_3=3$ KHz and $f_2=f_4=3.6$ KHz with an input baseband of 300 Hz to 3.4 KHz.

It will be appreciated that the inventions of U.S. application Ser. No. 617,733 and UK Applications 8513649 and 8421025 can with advantage be used in the system shown in FIGS. 1 and 3 of the present specification.

Figure 5:
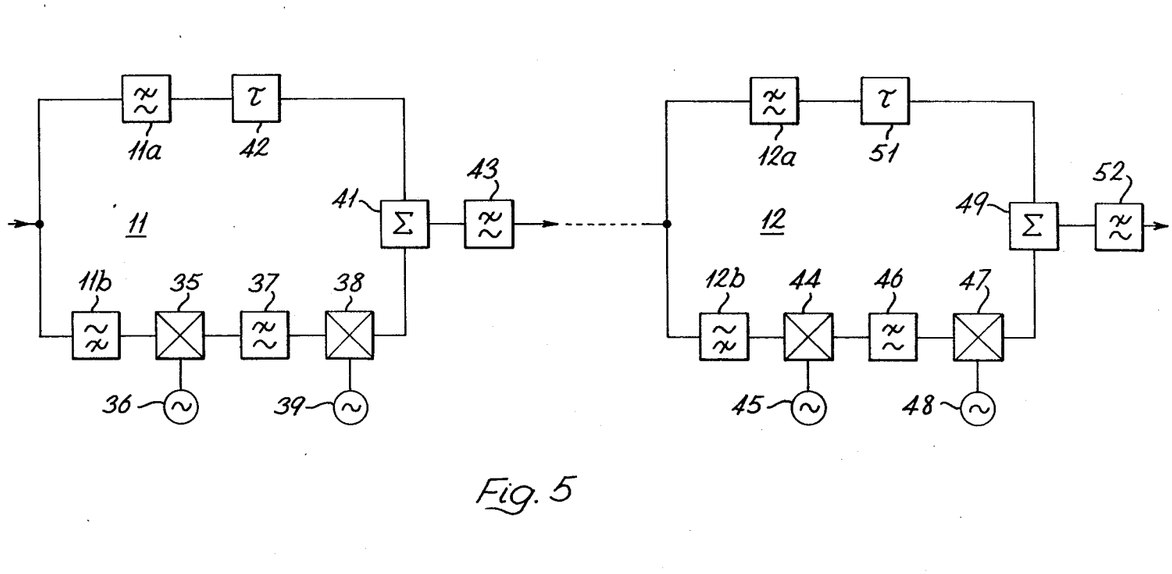

In FIG. 5 the "two oscillator" system of FIG. 2 of U.S. application Ser. No. 617,733 now U.S. Pat. No. 4,691,375 and UK Application No. 8513649 is modified to employ mirror filters. In FIG. 5 mirror filters 11 and 12 have the same functions as in FIGS. 1 and 3 of the present application; that is in the transmitter the baseband is divided into upper and lower portions by the filter 11 and in the receiver the received band is divided into upper and lower portions by the filter 12. However the output from filter 11b is passed to a mixer 35 where the upper portion of the input spectrum is translated in frequency using a signal from an oscillator 36. The upper sideband and the resulting signal is removed by a low pass filter 37 leaving the lower sideband which solely comprises signals corresponding to that part of the spectrum which is absent from the output of filter portion 11a. However this portion will in general not be in a spectral position to give a required width of frequency notch. For this reason the filter 37 is connected to another mixer 38 which receives a reference signal from an oscillator 39. The output from the mixer 38 is applied to a summing circuit 41 which also receives the output from the filter portion 11a by way of a delay circuit 42 which compensates for the delays experienced by the output from the filter portion 11b in the mixers 35 and 38 and the filter 37. The resulting spectrum at the output of the summing circuit 41 includes the upper and lower sidebands at the output from the mixer 38 but the upper sideband is removed by a bandpass filter 43.

At the receiver the input signal is applied to the mirror filter 12 where the output from the portion 12b passes to a mixer 44 receiving a reference signal from an oscillator 45. The lower sideband of the resultant output is selected using a lowpass filter 46 but in general its signal content will not be in its original spectral position in the frequency spectrum and therefore it is applied to a mixer 47 receiving a reference signal from an oscillator 48 before it reaches a summing circuit 49. Signals from the filter portion 12a pass through a delay circuit 51 which compensates for delays in the circuits 44, 46 and 47 before reaching the summing circuit 49. The lowpass filter 52 is connected to the output of the summing circuit 49 to remove the upper sideband of the signal from the mixer 47 and the output of the filter 52 is the original baseband restored to its position in the frequency spectrum.

Figure 6:
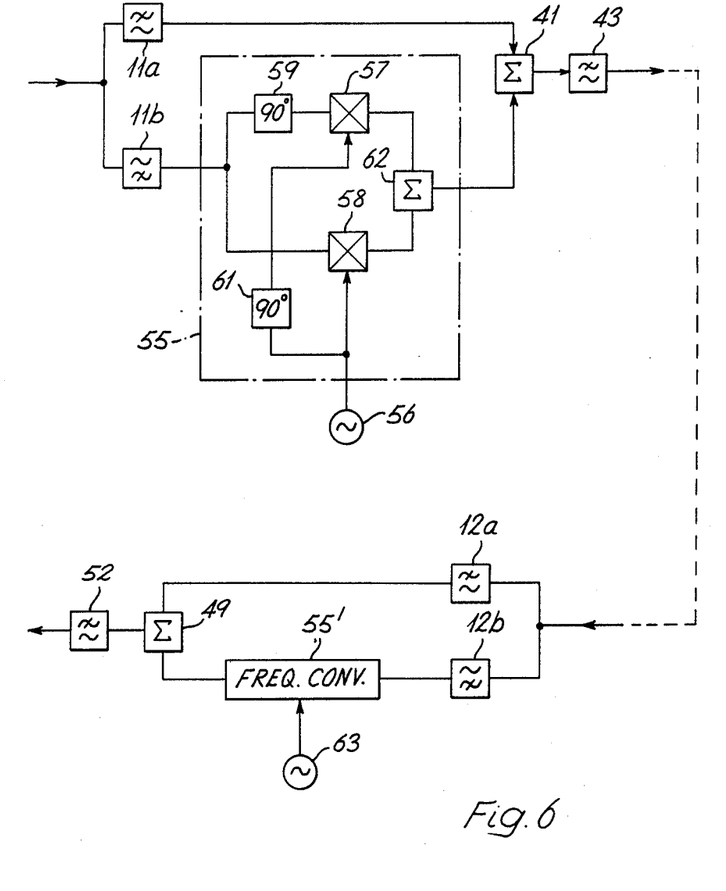

Another example of a TTIB system using mirror filters is shown in FIG. 6 where component circuits which have the same functions as in previous figures have the same designations.

As before incoming signals to be transmitted are divided into two portions by the mirror filters 11a and 11b but the low frequency portion is passed to a frequency converter 55 which translates this portion by an amount dependent on the frequency of an oscillator 56. Thus this frequency determines the width of the notch. The upper frequency portion reaches the summing circuit 41 from the high pass filter 11a.

Signals entering the frequency converter 55 are passed to separate mixer circuits 57 and 58 but signals received by the mixer circuit 57 are subject to a phase change of 90° in a circuit 59. The reference frequency for this mixer also passes by way of a 90° phase change circuit 61. As a result when the sidebands of the outputs of the mixer circuits 57 and 58 are summed in a circuit 62 only the upper sideband is passed to the summing circuit 41, since the lower sidebands cancel.

On reception the original upper frequency portion passes directly to the summing circuit 49 by way of the mirror filter 12a, but the sideband from the frequency converter 55 reaches a frequency converter 55' through the mirror filter 12b. The converter 55' is the same as the converter 55 except that the summing circuit 62 is replaced by a subtraction circuit (not shown). An oscillator 63 of the correct frequency (that is equal to the notch width) to restore the sideband from the converter 55 to its original position in the frequency spectrum is connected in place of the oscillator 56 to apply reference signals to the converter 55'.

Delay circuits similar to circuits 42 and 51 may be added if required, and the filters 11a, 11b, 12a and 12b need not be mirror filters.

It will be appreciated that the mirror filters of FIGS. 5 and 6 can also be applied to TTIB transmitters and receivers which employ a single oscillator to derive the notch and restore the frequency spectrum, respectively. Such transmitters and receivers are described in the above mentioned paper, U.S. application Ser. No. 617,733 and UK Applications 8513649, 8421025 and 8430319 (U.S. Pat. Nos. 4,691,375; 4,679,243; and U.S. application Ser. No. 06/798,801, respectively).

It will also be appreciated that the inventions of the above mentioned applications can also be applied with advantage to systems in which mirror filters are used to divide the input spectrum and/or the spectrum received by the receiver as indicated more specifically in FIG. 5.

The invention may be put into practice in many other ways: for example the frequencies $f_1$ to $f_4$ can be chosen together with filter characteristics to enable other combinations of side bands to be used and selected in circuits corresponding to FIGS. 1 and 3. Notches may, of course, be formed directly at other than IF frequencies.

The filters, mixers, delays, summing circuits and oscillators mentioned above may be implemented in any of the arrangements of the figures in whole or in part by means of operations and/or methods in one or more programmed computers, for example micro-processors, signal processing integrated circuits, or gate arrays.

We claim:

1. A communication system for TTIB operation comprising:

a transmitter, connected to first and second input terminals which receive a first signal and a second processing signal respectively, comprising:
means for dividing substantially a complete band of interest of a frequency spectrum of said first signal received by said first input terminal into upper and lower frequency portions, and for frequency translating said upper and lower frequency portions by different amounts, to provide a transmitter output signal that includes a notch between the frequency translated upper portion and the frequency translated lower portion;
means for inserting said second, processing signal received by the second input terminal into said notch in said transmitter output signal to provide a modified transmitter output signal and to thereby use said notch in said modified transmitter output signal to transmit said second processing signal; and
means for transmitting the modified transmitter output signal; and a receiver comprising:
means for receiving the modified transmitter output signal as a received signal including a notch corresponding to the notch in said modified transmitter output signal,
means for recovering said second processing signal from the notch in the received signal to allow said second signal to be used for subsequent processing of signals derived from said received signal; and
means for frequency translating said upper and said lower portions in frequency by different amounts to remove said notch in said received signal and provide a continuous and complete output spectrum.

2. A transmitter for TTIB operation comprising:
first and second input terminals receiving first and second signals, respectively, said first signal including a frequency spectrum and said second signal being for use in processing said frequency spectrum;
means, connected to said first and second input terminals to receive said first and second signals, for dividing substantially a complete band of interest of said frequency spectrum of said first signal received by said first input terminal into upper and lower frequency portions, and for frequency translating said upper and lower frequency portions by differing amounts to provide an output signal with a notch between the translated upper and lower portions,
means for including said second signal received by second input terminal into said notch in said output signal, and
means for transmitting said output signal including said second signal.

3. A receiver for TTIB operation comprising:
first means at which, in operation, input signals derived from a transmitted signal appear as an input, said transmitted signal having two frequency spectrum portions separated by a frequency spectrum notch which carries a control signal;
second means at which, in operation a control signal derived from said transmitted signal appears as an output for use in processing signals;
means, with an output coupled to said first means, for receiving a frequency band containing said two frequency spectrum portions separated by said frequency spectrum notch, and for translating said two frequency spectrum portions in frequency by different amounts to remove said notch and provide a continuous output spectrum at said first means; and
means, with an output coupled to said second means, for receiving said transmitted signal and recovering said control signal from said frequency spectrum notch and applying said control signal to said second means to allow said control signal to be used for processing of signals derived from said transmitted signal.

4. A method for transmission and reception for TTIB operation comprising the steps of:
receiving a frequency spectrum to be transmitted at a first input terminal;
dividing substantially a complete band of interest of said frequency spectrum into upper and lower frequency portions;
translating said portions in frequency by differing amounts to provide a signal with a notch between the translated upper and lower portions;
receiving a processing signal at a second input terminal;
inserting said processing signal into said notch in said signal to be transmitted as a part of a resultant signal to be transmitted;
transmitting said resultant signal;
receiving said resultant signal as two received portions with said notch therebetween;
translating the two received portions in frequency by different amounts to provide a continuous output spectrum; and
recovering said processing signal transmitted using said notch from said resultant signal for subsequent use in processing signals derived from said resultant signal.

5. A communication system for TTIB comprising:
a transmitter including:
first and second input terminals receiving first and second signals respectively;
mirror filter means for dividing substantially a complete band of interest of a frequency spectrum of said first signal received by the first input terminal into upper and lower portions, the mirror filter means comprising a first pair of filters having a predetermined and symmetrical frequency versus attenuation characteristic between input terminals and output terminals;
means for frequency translating at least one of said portions to produce a frequency spectrum with a frequency notch between said portions;
means for including said signal received by the second input terminal into said notch in said frequency spectrum; and
means for transmitting said frequency spectrum including said portions, said notch, and said second signal; and
a receiver including:
means for receiving said frequency spectrum including said portions, said notch and said second signal;
further mirror filter means for separating each said portion from the received frequency spectrum, the further mirror filter means comprising a second pair of filters having a predetermined frequency versus attenuation characteristic between input terminals and output terminals;
means for translating at least one of said portions in frequency and combining said upper and lower portions to provide a continuous output spectrum; and
means for recovering said second signal from said notch in said frequency spectrum.

6. A communication system according to claim 5 wherein at least one of the means for frequency translating comprises first and second mixers arranged to receive the outputs of the filters, respectively, of the mirror filter means, means for supplying different reference signals to the first and second mixers, and summing means for summing the outputs of the first and second mixers.

7. A communication system according to claim 5 wherein at least one of said filter pairs comprise complementary filters in which a characteristic of one filter is a complement of a characteristic of another filter.

8. A transmitter for TTIB operation comprising:
first and second input terminals receiving first and second signals respectively;
mirror filter means for dividing substantially a complete band of interest of a frequency spectrum of said first signal received by said first input terminal into upper and lower portions, the mirror filter means comprising a pair of filters having a predetermined frequency versus attenuation characteristic between input terminals and output terminals;
means for frequency translating at least one of the said portions to derive a frequency spectrum with a frequency notch between said portions;
means for including said second signal received by said second input terminal in said frequency notch in said frequency spectrum, and
means for transmitting said frequency spectrum including said second signal in said frequency notch.

9. A transmitter according to claim 8 wherein the means for frequency translating comprises first and second mixers arranged to receive the outputs of the filters, respectively, of the mirror filter means, means for supplying different reference signals to the first and second mixers, and summing means for summing the outputs of the first and second mixers.

10. A receiver for TTIB operation comprising:
receiver means for receiving a frequency band including two frequency-spectrum portions separated by a notch which is used for transmitting a control signal;
mirror filter means for separating each said frequency-spectrum portion from the received frequency band, the mirror filter means comprising a pair of filters having a predetermined frequency versus attenuation characteristic between input terminals and output terminals thereof;
means for translating at least one of said two frequency spectrum portions from said receiver means in frequency and combining the two frequency spectrum portions to remove said notch and provide a continuous output spectrum; and means for recovering said control signal from the notch in said frequency band.

11. A receiver according to claim 10 wherein the means for frequency translating comprises first and second mixers arranged to receive the outputs of the filters, respectively, of the mirror filter means, means for supplying different reference signals to the first and second mixers, and summing means for summing the outputs of the first and second mixers.

12. A receiver according to claim 10 wherein said means for frequency translating includes frequency converter means for:
 (a) mixing an incoming signal with a reference signal having a frequency equal to a width of said notch,
 (b) changing a phase of the incoming signal and a phase of said reference signal by 90° and mixing the resulting signals together, and
 (c) combining the signals obtained after mixing the incoming signal with a reference signal in a way in which one sideband from one mixing operation is cancelled by a corresponding sideband from another mixing operation and only a required sideband remains.

13. A communication system, according to claim 1 or 5, wherein at least one of said means for dividing and frequency translating includes frequency converter means for:
 (a) mixing an incoming signal with a reference signal having a frequency equal to a width of said notch,
 (b) changing a phase of the incoming signal and a phase of the reference signal by 90°, and mixing the resulting signals together, and
 (c) combining the signals obtained after mixing the incoming signal with the reference signal in a way in which one sideband from one mixing operation is cancelled by a corresponding sideband from another mixing operation and only a required sideband remains.

14. A transmitter according to claim 2 or 8 wherein said means for dividing and frequency translating includes frequency converter means for:
 (a) mixing an incoming signal with a reference signal having a frequency equal to a width of said notch,
 (b) changing a phase of the incoming signal and a phase of the reference signal by 90° and mixing the resulting signals together, and
 (c) combining the signals obtained after mixing the incoming signal with the reference signal in a way in which one sideband from one mixing operation is cancelled by a corresponding sideband from another mixing operation and only a required sideband remains.

15. A receiver according to claim 3 or 10 wherein the means for frequency translating includes frequency converter means for:
 (a) mixing an incoming signal with a reference signal having a frequency equal to a width of said notch,
 (b) changing a phase of the incoming signal and a phase of the reference signal by 90° and mixing the resulting signals together, and
 (c) combining the signals obtained after mixing the incoming signal with the reference signal in a way in which one sideband from one mixing operation is cancelled by a corresponding sideband from another mixing operation and only a required sideband remains.

16. A communication system for TTIB operation comprising:
 a transmitter, connected to first and second input terminals which receive first and second signals respectively, comprising:
 dividing and translating means for:
  (1) dividing substantially a complete band of interest of a frequency spectrum of said first signal received by said first input terminal into upper and lower frequency portions,
  (2) frequency mixing said upper portion with a first frequency to produce upper and lower sidebands of said upper portion,
  (3) frequency mixing said lower portion with a second frequency to produce upper and lower sidebands of said lower portion, and
  (4) producing a combined signal comprised of said upper sidebands of said upper and lower portions, which includes a frequency notch between said upper sidebands;
 means for inserting said second signal received by the second input terminal into said notch in said combined signal to thereby use said notch to transmit said second signal and provide a resultant signal for transmission; and
 means for transmitting the resultant signal; and a receiver comprising:
 means for receiving the transmitted resultant signal,
 means for recovering said second signal from the notch in said resultant signal to allow said second signal to be used for subsequent processing of signals derived from said resultant signal; and
 means for frequency translating said upper and said lower portions in said resultant signal in frequency by different amounts to remove said notch and provide a continuous and complete output spectrum.

17. A method for transmission and reception for TTIB operation comprising the steps of:
 receiving a frequency spectrum to be transmitted at a first input terminal;
 dividing substantially a complete band of interest of said frequency spectrum received by said first input terminal into upper and lower frequency portions;
 frequency mixing said upper portion with a first frequency to produce upper and lower sidebands of said upper portion;
 frequency mixing said lower portion with a second frequency to produce upper and lower sidebands of said lower portion;
 producing a combined signal comprised of said upper sidebands of said upper and lower portions, which includes a frequency notch between said upper sidebands;
 receiving a signal at a second input terminal;
 inserting said signal into said notch in said combined signal as a part of a resultant signal to be transmitted;
 transmitting said resultant signal portions to provide two received portions;
 receiving said resultant signal;
 translating the two received portions in said resultant in frequency by different amounts to provide a continuous output spectrum; and recovering said signal transmitted using said notch in said resultant signal for subsequent use in processing signals derived from said resultant signal.

18. A transmitter for TTIB operation comprising:

first and second input terminals receiving first and second signals, respectively, said first signal including a frequency spectrum and said second signal being for use in processing said frequency spectrum;

dividing and translating means for:
(1) dividing substantially a complete band of interest of a frequency spectrum of said first signal received by said first input terminal into upper and lower frequency portions,
(2) frequency mixing said upper portion with a first frequency to produce upper and lower sidebands of said upper portion,
(3) frequency mixing said lower portion with a second frequency to produce upper and lower sidebands of said lower portion, and
(4) producing a combined signal comprised of said upper sidebands of said upper and lower portions, which includes a frequency notch between said upper sidebands;

means for inserting said frequency notch to transmit said second signal received by second input terminal into said notch in said combined signal as part of a resultant signal to be transmitted; and means for transmitting said resultant signal.

* * * * *